(12) United States Patent
Faulkner et al.

(10) Patent No.: US 10,951,947 B2
(45) Date of Patent: Mar. 16, 2021

(54) DYNAMIC CONFIGURATION OF A USER INTERFACE FOR BRINGING FOCUS TO TARGET EVENTS

(71) Applicant: MICROSOFT TECHNOLOGY LICENSING, LLC, Redmond, WA (US)

(72) Inventors: Jason Thomas Faulkner, Seattle, WA (US); Sonu Arora, Kirkland, WA (US); Santhosh Kumar Misro, Issaquah, WA (US); Joshua George, Redmond, WA (US); Kevin Daniel Morrison, Arlington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 234 days.

(21) Appl. No.: 16/021,860

(22) Filed: Jun. 28, 2018

(65) Prior Publication Data
US 2019/0222892 A1    Jul. 18, 2019

Related U.S. Application Data

(60) Provisional application No. 62/606,152, filed on Jan. 17, 2018.

(51) Int. Cl.
*H04N 21/442* (2011.01)
*H04N 21/431* (2011.01)
(Continued)

(52) U.S. Cl.
CPC ... *H04N 21/44213* (2013.01); *G06K 9/00288* (2013.01); *H04N 7/147* (2013.01);
(Continued)

(58) Field of Classification Search
CPC ......... H04N 21/44213; H04N 21/2187; H04N 21/25875; H04N 21/4223; H04N 21/4314;
(Continued)

(56) References Cited

U.S. PATENT DOCUMENTS 7,797,383 B2    9/2010  Baird
8,248,448 B2    8/2012  Feng et al.
(Continued)

OTHER PUBLICATIONS

Michel, et al., "Real Time Facial Expression Recognition in Video using Support Vector Machines", In Proceedings of the 5th international conference on Multimodal interfaces, Nov. 5, 2003, 7 Pages.

*Primary Examiner* — Nicholas T Corbo
(74) *Attorney, Agent, or Firm* — Newport IP, LLC; Jacob P. Rohwer

(57) ABSTRACT

The disclosed system implements techniques to identify activity in which attendees to a communication session likely have a greater interest. Prior to commencement of a communication session or during the communication session, the techniques enable a list of attendees to a communication session to be designated as a group for which detected activity has a priority with respect to being displayed. The designated list of attendees is a subset of a total number of attendees to the communication session. The system monitors streams associated with individual attendees on the list to detect an occurrence of a preset target event. The system configures a portion of a graphical user interface of the communication session to accentuate the stream that includes the occurrence of the preset target event.

20 Claims, 8 Drawing Sheets

(51) Int. Cl.
*H04N 21/258* (2011.01)
*H04N 21/2187* (2011.01)
*G06K 9/00* (2006.01)
*H04N 21/4788* (2011.01)
*H04N 7/15* (2006.01)
*H04N 21/4223* (2011.01)
*H04N 7/14* (2006.01)

(52) U.S. Cl.
CPC ............ *H04N 7/15* (2013.01); *H04N 21/2187* (2013.01); *H04N 21/25875* (2013.01); *H04N 21/4223* (2013.01); *H04N 21/4314* (2013.01); *H04N 21/44218* (2013.01); *H04N 21/4788* (2013.01)

(58) Field of Classification Search
CPC ......... H04N 21/44218; H04N 21/4788; H04N 7/147; H04N 7/15; G06K 9/00288
See application file for complete search history.

(56) References Cited

U.S. PATENT DOCUMENTS

| | | |
|---|---|---|
| 8,477,174 B2 | 7/2013 | Michaelis |
| 8,670,018 B2 | 3/2014 | Cunnington et al. |
| 9,641,585 B2 | 5/2017 | Kvaal et al. |
| 9,706,171 B1 | 7/2017 | Riley et al. |
| 2010/0302346 A1* | 12/2010 | Huang ................ H04L 12/1827 348/14.09 |
| 2013/0063537 A1* | 3/2013 | Emori ..................... H04N 7/15 348/14.01 |
| 2016/0277802 A1 | 9/2016 | Bernstein et al. |
| 2017/0177928 A1 | 6/2017 | Cunico et al. |

\* cited by examiner

DYNAMIC CONFIGURATION OF A USER INTERFACE FOR BRINGING FOCUS TO TARGET EVENTS

PRIORITY APPLICATION

This Non-Provisional Application claims the benefit of and priority to U.S. Provisional Application No. 62/606,152, filed Jan. 17, 2018, and entitled "Configuring a User Interface with Activity From Designated Attendees to a Communication Session", the entire contents of which are incorporated herein by reference.

BACKGROUND

Presently, the use of communication (e.g., video conference, teleconference, broadcast, etc.) systems in personal and commercial settings has increased dramatically so that meetings and presentations can be facilitated across remote locations. In general, communication systems allow users, in two or more remote locations, to communicate with one another via live or recorded video streams, audio streams, or both (e.g., see one another, hear one another, and/or interact with one another). Some communication systems also allow users to share display screens that present, for example, content items such as images, text, video, applications, and any other content items that are rendered on the display screen(s) the user is sharing. Example communication systems include CISCO WEBEX provided by CISCO SYSTEMS, Inc. of San Jose, Calif., GOTOMEETING provided by CITRIX SYSTEMS, INC. of Santa Clara, Calif., ZOOM provided by ZOOM VIDEO COMMUNICATIONS of San Jose, Calif., GOOGLE HANGOUTS by ALPHABET INC. of Mountain View, Calif., and SKYPE FOR BUSINESS or MICROSOFT TEAMS provided by the MICROSOFT CORPORATION, of Redmond, Wash.

Conventional communication systems typically monitor video feeds that are input to a communication session to detect actions (e.g., speech, movement, shared screen content, etc.) performed by people participating in the communication session. Such communication systems then configure a user interface to display the detected actions.

However, conventional communication systems can be ineffective with respect to identifying and displaying activity that is relevant to the people participating in a communication session. That is, as the number of users that are able to participate in a communication session increases, conventional communication systems expend a considerable amount of resources identifying and displaying activity deemed to be relevant to the people participating in the communication session. For example, a conventional communication system implementing a broadcast presentation with hundreds or thousands of people in attendance can expend a considerable amount of resources sorting through and analyzing a large number of video feeds to identify relevant audience activity that attendees are more likely interesting in viewing.

SUMMARY

The disclosed system addresses the problems described above by implementing techniques to identify activity in which people attending a communication session likely have a greater interest. In one example, the communication session can comprise a live broadcast in which one or more users are presenting and/or speaking to an audience. In another example, the communication session can comprise a video conference that includes multiple participants. The techniques disclosed herein provide improvements and benefits over existing systems by identifying activity of one or more designated individuals in which an audience or participants of a communication session likely have a greater interest. A system can then accentuate a display of the identified activity to draw user attention to the activity. In addition to accentuating the display of the identified activity, the system can remove or limit the display of other activity. Such techniques can improve user interaction with a computing device, which can help a user's productivity and help reduce the number of inadvertent inputs. Also, by accentuating a display of some content and removing the display of other less important content, a system can operate more efficiently with respect to the use of memory, processing resources, network resources, etc. Other technical effects other than those mentioned herein can also be realized from implementations of the technologies disclosed herein.

In some configurations, a system can receive a user input that designates a person. The designated person can be selected from an audience or participants that are part of a broadcast session or a video conference session. For example, a broadcast or a video conference session can include employees of a company at various levels. A participant, for instance, may only be interested in seeing certain reactions of the company's executives, e.g., the CEO and company Presidents. The participant can designate those individuals, and in response to such a designation, the system will only monitor the activity of those individuals. When the system detects a particular event associated with the designated individuals, the system can accentuate a display of the identified activity. By allowing a user to select at least one designated person, a system can focus computing resources on monitoring the activity of a few individuals instead of monitoring activity of each participant or a broader audience. Such features can further a system's ability to operate more efficiently with respect to the use of memory, processing resources, network resources, etc.

An attendee to a communication session can include a member of an audience or an individual participant. An attendee can be a person that is in range of a camera or other image or audio capture devices. Activity, such as movement or sounds, of the person can be communicated to other participants while the person is viewing and/or listening to the content being shared via the communication session. For instance, an attendee may be sitting in a crowd viewing the shared content live at a broadcast location where a stage presentation occurs. Or an attendee may be sitting in an office conference room viewing the shared content of a communication session with other colleagues via a display screen. Even further, an attendee may be sitting or standing in front of a personal device (e.g., tablet, smartphone, computer, etc.) viewing the shared content of a communication session alone in their office or at home.

In some configurations, a person can be included on a designated list of attendees. The designated list of attendees is a subset of a total number of attendees to the communication session. This enables the system to focus activity detection and the display of the detected activity to a smaller number of people that viewers likely have an interest in. As a result of this focus, system resources can be conserved because the disclosed communication system is no longer required to monitor and analyze all the video feeds being input to a communication session to identify and display relevant activity people are more likely interesting in viewing.

In various embodiments described herein, the detected activity comprises movement and/or sound related to reactions and/or expressed emotions. For instance, the designated list of attendees can be made up of audience members and the detected activity can occur in response to main activity (e.g., dominant activity) of the communication session performed by a primary contributor to the communication session (e.g., a person currently talking during a meeting, a scheduled speaker for a broadcast presentation, a person expected to actively discuss a topic of the communication session, etc.). In a specific example, employees of a company may likely have a greater interest in viewing an executive officer's reaction, rather than a common person's reaction, to a joke made by a presenter or a stage announcement of quarterly numbers or the release of a new product. In another example, members of a work team collaborating on a project may likely have a greater interest in hearing thoughts of a project manager, rather than thoughts of a common team member, on an argument regarding whether a product feature should be included in an imminent product release.

Consequently, in various embodiments described herein, the people designated on the list may not be people known to contribute or expected to contribute to the communication session during a particular period of time. Rather, the people designated on the list are likely people that are part of the audience to the communication session during the particular period of time and that are watching the main contributors to the communication session. Moreover, in various examples, the people designated on the list may be more important people compared to the average audience member (e.g., executives of a company, honored guests, an employee receiving an award, a project manager, etc.). Activity performed by important people is likely to be of greater interest to the general audience. Accordingly, in these embodiments, a video feed capturing a designated person on the list is not initially displayed in the graphical user interface of the communication session that is being output to the attendees. Rather, the video feed capturing the designated person may be added to the graphical user interface and/or accentuated after activity is detected.

In alternative embodiments described herein, the people designated on the list may also be people known to contribute or expected to contribute to the communication session. Accordingly, the list can be used as a tool to reduce the number of people being monitored for activity. In some instances, this may prevent an attendee to a communication session, who is not designated on the list, from having activity detected and shared with others. Again, by limiting the number of attendees being monitored and analyzed for activity, computing resources (e.g., processing resources, memory resources, and networking resources) can be conserved.

Accordingly, the disclosed system is configured to receive user input that designates an attendee to a communication session and to identify a video feed that is associated with the designated attendee. Video data of a video feed can be captured by one of multiple different cameras fixed on attendees to the communication session. For example, a camera coupled to a personal device can capture sounds and movement of a remote attendee placed in front of the personal device. A camera configured in a conference room of an office can capture sounds and movement of attendees in the conference room. A camera configured in an assembly hall where a broadcast presentation is taking place can capture sounds and movements of attendees in the assembly hall. In accordance with these example, an attendee can be a live attendee or a remote attendee.

The system monitors the video feeds that are associated with the designated attendees to detect relevant activity, or an occurrence of a preset target event. Responsive to detecting an occurrence of a preset target event, the system automatically (e.g., without user input) configures at least a portion of a graphical user interface associated with the communication session to accentuate the video feed that includes the occurrence of the preset target event so that it is viewable by the attendees to the communication session. The automatic configuration is intended to bring focus to the occurrence of the preset target event. For example, the video feed can replace another video feed already displayed in the graphical user interface of the communication session. In another example, the video feed can be displayed adjacent to a video feed that is already displayed in the graphical user interface. In yet another example, a size of a display area that contains the video feed can be increased in the graphical user interface of the communication session. In even a further example, a format of a display area that contains the video feed can be altered (e.g., highlighting, changing colors, flashing, etc.) in the graphical user interface. In some instances, a camera can perform a zoom function to zoom in on an individual attendee that is a source of the occurrence of the preset target event.

In various embodiments, the portion of the graphical user interface that displays the video feed that includes the occurrence of the preset target event can be a portion dedicated to audience reactions that occur in response to main activity of the communication session performed by a primary contributor to the communication session (e.g., a person speaking on a stage).

A preset target event can be based on body movement of an attendee, facial movement of an attendee, and/or an audible sound produced by an attendee. For example, a preset target event can include movements and/or sounds corresponding to a defined gesture. Thus, different types of preset target events can include a head nod, a head shake, clapping, switching from a sitting position to a standing position, raising a hand, etc. In another example, a preset target event can include movements and/or sounds corresponding to a facial expression. Thus, different types of preset target events can include a smile, a frown, a laugh, raised eyebrows, etc. In yet another example, a preset target event can include movements and/or sounds corresponding to an outward display of emotion. Thus, different types of preset target events can include a sad reaction, an angry reaction, a happy reaction, a surprised reaction, an excited reaction, a disappointed reaction, etc.

In various examples, the detection of a preset target event can be based on recognizing that an amount of body and/or facial movement of an attendee exceeds a threshold amount. In other examples, the detection of a preset target event can be based on recognizing that body and/or facial movement deviates from a previous position (e.g., a standard body pose, a normal facial expression, etc.).

Accordingly, detected movement and/or detected sounds can be recognized, and in some cases, the detected movement and/or detected sounds can be mapped to a specific type of preset target event, examples of which are provided in the preceding paragraph(s). In additional examples, a type of preset target event can comprise: an attendee joining the communication session, an attendee leaving the communication session, recognition that a particular person begins to speak, or any other activity determined to provide value or contribute to understanding a context of the communication session.

The list of designated attendees can be received by entering names or other user identifications of people attending the communication session or expected to attend the communication session. A host of the communication session, a producer of the communication session, or any other participant in the communication session with certain permissions and privileges can manually enter the names or other user identifications. Once a name or user identification is received, the system is configured to identify a video feed that is associated with the entered name or user identification. For instance, the identification can be based on a match or a correspondence between the entered name and login credentials used to join the communication session on a personal device (e.g., a user login ID and/or a password). Alternatively, the identification can be based on a match or a correspondence between the entered name and facial features of a user (e.g., based on a stored image). Using the facial features, a scan of people captured by a camera fixed on a particular area (e.g., an office conference room, a portion of an assembly hall, etc.) can be performed and facial recognition techniques can be used to determine a position of the individual attendee within the room and/or within a video feed of the room. Voice recognition techniques can also or alternatively be used to determine a position of the individual attendee.

In additional or alternative examples, the list of designated attendees can be received via user input selecting a video feed as one that contains an attendee on the list and/or via user input marking a position of a designated attendee within the video feed.

In further examples, a session agenda or a session transcript can be used to add designated attendees to the list of attendees. For instance, an agenda and/or a transcript of topic(s) to be discussed and content to be shared may reveal names of attendees that are to be mentioned during the communication session (e.g., "John Smith" is to receive a reward, a new product developed by "Jane Doe" is to be announced, a company is announcing that long time employee "Beth Williams" is retiring, etc.). Thus, names that are to be mentioned during the communication session can provide a basis for adding a designated attendee to the list.

In various embodiments, the system can be configured to select a detected occurrence of a preset target event for display over other detected occurrences of preset target events based on a rule that prioritizes a source of a preset target event (e.g., the person that performs the target event). The rule can be applied so that more important occurrences of preset target events are displayed in a situation where multiple occurrences of preset target events take place at the same time, or within a short period of time (e.g., three seconds, five seconds, ten seconds, etc.). The rule can be used to select an occurrence of a preset target event from one attendee on the list (e.g., a CEO of the company) over another occurrence of another preset target event from another attendee on the list (e.g., a lower-level employee of the company). Therefore, the attendees designated on the list can be ranked based on importance to ensure that preset target events associated with the more important people on the list are accentuated in the graphical user interface of the communication session. Moreover, the selection can be based on content of the communication session currently being shared. For instance, if a speaker is currently talking about a particular person or talking about subject matter related to a particular person, then a preset target event performed by that person, who is on the list, is selected over other preset target events performed by other attendees on the list. In a specific example, the system can focus on occurrences of preset target events from a chief financial officer when quarterly financials of a company are being reported during a communication session. In another specific example, the system can focus on occurrences of preset target events from a manager of a particular product group when a new product developed by the particular product group is publicly released during a communication session.

In various embodiments, the system can be configured to select a detected occurrence of a preset target event for display over other detected occurrences of preset target events based on a rule that prioritizes a type of preset target event. Again, the rule can be applied so that more important occurrences of preset target events are accentuated in the graphical user interface of the communication session in a situation where multiple occurrences of preset target events take place at the same time, or within a short period of time. The rule can be used to select occurrences of a specific type of preset target event (e.g., an occurrence of people clapping and/or smiling) over occurrences of other types of preset target events (e.g., people booing or frowning). Therefore, types of preset target events can be ranked based on importance to ensure that more important types of preset target events are displayed in the communication session. Moreover, the selection can be based on content of the communication session currently being shared. For instance, if a question and answer portion of a communication session is currently taking place, then a "hand raising" type preset target event performed by an attendee on the list can be selected over a "clapping" type preset target event performed by another attendee on the list.

In some implementations, a system may include means to cause a graphical user interface to be displayed, the graphical user interface populated with video data. The system may also include means to receive user input that designates a person. In addition, the system may include means to identify a video feed that contains the designated person, the video feed being one of a plurality of video feeds, and means to monitor the video feed for preset target events associated with the designated person. Furthermore, the system can include means to detect, based on the monitoring of the video feed, an occurrence of a preset target event associated with the designated person, and means to automatically configure at least a portion of the graphical user interface to accentuate the video feed.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Examples described herein provide a system that detects and display activity that is likely to be of greater interest to all the attendees to the communication session. In various embodiments, the attendees on the list may not be people known to contribute to or expected to contribute to the communication session during a particular segment or period of time. Rather, the attendees included on the list may be people that are part of an audience consuming content that is being shared, via a graphical user interface, during the communication session by main or dominant contributors. Accordingly, in these embodiments, a video feed capturing a designated person on the list is not initially displayed in the graphical user interface of the communication session that is being output to the attendees. Rather, the video feed capturing the designated person may be added to the graphical user interface and/or accentuated after activity is detected. In further embodiments, the attendees on the list may additionally or alternatively include people known to contribute or expected to contribute to the communication session during a particular segment or period of time.

Consequently, the list can be used as a tool to reduce the number of people and/or video feeds being monitored and analyzed for activity, thereby conserving computing resources (e.g., processing resources, memory resources, and networking resources).

As described above, an attendee to a communication session is a person that is in range of a camera or other image and/or audio capture device such that actions and/or sounds of the person which are produced while the person is viewing and/or listening to the content being shared via the communication session can be captured (e.g., recorded). For instance, an attendee may be sitting in a crowd viewing the shared content live at a broadcast location where a stage presentation occurs. Or an attendee may be sitting in an office conference room viewing the shared content of a communication session with other colleagues via a display screen. Even further, an attendee may be sitting or standing in front of a personal device (e.g., tablet, smartphone, computer, etc.) viewing the shared content of a communication session alone in their office or at home.

Various examples, implementations, scenarios, and aspects are described below with reference to FIGS. 1 through 8.

Figure 1:
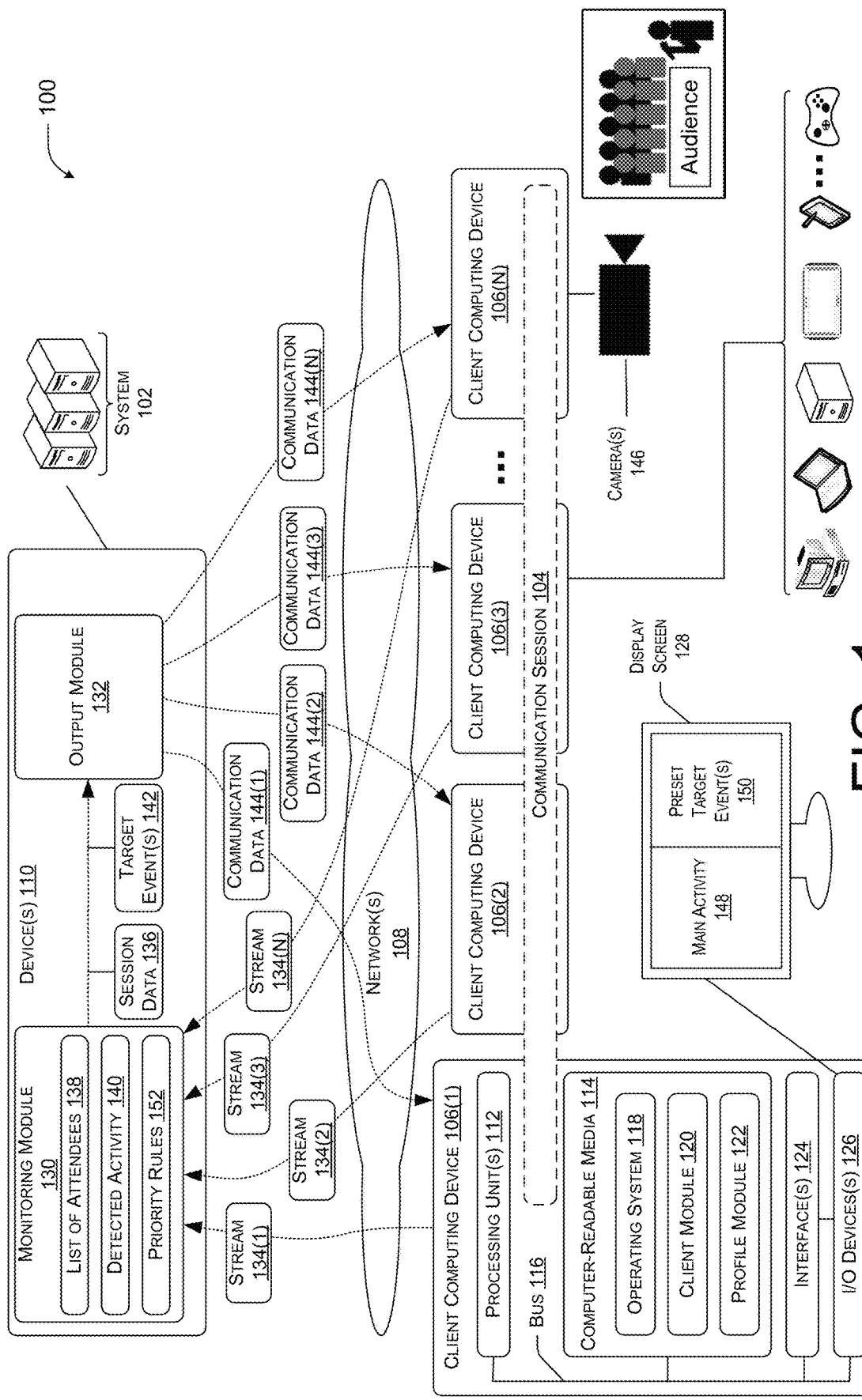
FIG. 1 is a diagram illustrating an example environment in which a system can operate to detect and to display occurrences of preset target events associated with a designated list of attendees.

FIG. 1 is a diagram illustrating an example environment 100 in which a system 102 can operate to detect and to display occurrences of preset target events associated with a designated list of attendees. The people on the list may be attendees to a communication session 104. In this example, the communication session 104 is implemented between a number of client computing devices 106(1) through 106(N) (where N is a positive integer number having a value of two or greater) that are associated with the system 102 or are part of the system 102. The client computing devices 106(1) through 106(N) enable users to attend (e.g., participate in) the communication session 104, and thus a user may be referred to herein as an attendee to the communication session 104.

The communication session 104 in this example is hosted, over one or more network(s) 108, by the system 102. That is, the system 102 can provide a service that enables users of the client computing devices 106(1) through 106(N) to view and/or hear people during the communication session 104 and/or to view and/or hear content items shared during the communication session 104. A content item may include, for example, a data file (e.g., a document, a spread sheet, a presentation, etc.), a computer application (e.g., a computer-aided design (CAD) application that the user may use to show three-dimensional models, a media player application that the user may use to show a video, etc.), a web browser, a user desktop, and/or any other type of content item suitable for sharing during a communication session 104. As an alternative, the communication session 104 can be hosted by one of the client computing devices 106(1) through 106(N) utilizing peer-to-peer technologies.

An attendee can view content of the communication session 104 live as activity occurs, or alternatively, via a recording at a later time after the activity occurs. In examples described herein, client computing devices 106(1) through 106(N) participating in the communication session 104 are configured to receive and render for display, on a user interface of a display screen, communication data. The communication data can comprise a collection of various instances, or streams, of live and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. Accordingly, the various streams of content within the communication data enable a broadcast or a video conference to be facilitated amongst a group of people dispersed across remote locations.

In some implementations, the various streams of live or recorded content within the communication data may originate from a plurality of co-located video cameras, positioned in a space, such as a room or an assembly hall, to record or stream live a presentation that includes one or more individuals presenting and one or more individuals consuming presented content (e.g., a stage audience).

The system 102 includes device(s) 110. In various examples, the device(s) 110 and/or other components of the system 102 can include distributed computing resources that communicate with one another and/or with the client computing devices 106(1) through 106(N) via the one or more network(s) 108. In some examples, the system 102 may be an independent system that is tasked with managing aspects of one or more communication sessions such as communication session 104. As an example, the system 102 may be managed by entities such as SLACK, WEBEX, GOTOMEETING, GOOGLE, FACEBOOK, etc. As an alternative, the communication session 104 can be hosted by a client computing device. For instance, a device 110 can be included in the group of client computing devices 106(1) through 106(N) utilizing peer-to-peer technologies and/or mobile-to-mobile scenarios to implement the techniques described herein.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, a mixed reality ("MR") device, an implanted computing device, an automotive computer, a network-enabled television, a thin client, a terminal, an Internet of Things ("IoT") device, a work station, a media player, a personal video recorders ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 118, a client module 120, a profile module 122, and other modules, programs, or applications that are loadable and executable by processing units(s) 112.

Client computing device(s) 106(1) through 106(N) may also include one or more interface(s) 124 to enable communications between client computing device(s) 106(1) through 106(N) and other networked devices, such as device(s) 110, over network(s) 108. Such network interface(s) 124 may include one or more network interface controllers (NICs) or other types of transceiver devices to send and receive communications and/or data over a network. Moreover, client computing device(s) 106(1) through 106(N) can include input/output ("I/O") interfaces 126 such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 1 illustrates that client computing device 106(1) is in some way connected to a display device (e.g., a display screen 128), which can display a GUI according to the techniques described herein.

In the example environment 100 of FIG. 1, client computing devices 106(1) through 106(N) may use their respective client modules 120 to connect with one another and/or other external device(s) in order to participate in the communication session 104. For instance, a first user may utilize a client computing device 106(1) to attend a communication session where the first user communicates with or consumes content associated with a second user of another client computing device 106(2) who also attends the communication session. When executing client modules 120, the users may share data, which may cause the client computing device 106(1) to connect to the system 102 and/or to the other client computing devices 106(2) through 106(N) over the network(s) 108.

The client computing device(s) 106(1) through 106(N) may use their respective profile module 122 to generate participant (i.e., attendee) profiles, and provide the participant profiles to other client computing devices and/or to the device(s) 110 of the system 102. A participant profile may include one or more of an identity of a user or a group of users (e.g., a name, an alias, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 1, the device(s) 110 of the system 102 includes a monitoring module 130 and an output module 132. In this example, the monitoring module 130 is configured to receive, from individual client computing devices such as client computing devices 106(1) through 106(N), media streams 134(1) through 134(N). As described above, media streams can comprise a video feed (e.g., audio and visual data associated with a user), an audio stream which is to be output with a presentation of an avatar of a user (e.g., an audio only experience), text data (e.g., text messages), file data and/or screen sharing data, and so forth. Thus, the monitoring module 130 is configured to receive a collection of various media streams 134(1) through 134(N) during a live viewing of the communication session 104 (the collection being referred to herein as media data 134). In some scenarios, not all the client computing devices that participate in the communication session 104 provide a media stream. For example, a client computing device may only be a "consuming", or a "listening", device such that it only receives data associated with the communication session 104 but does not provide any data to the communication session 104 to be shared with others. This may occur with regard to a live broadcast where one or more video feeds of a stage presenter are the main output displayed in the graphical user interface of the communication session. However, there may be additional video feeds, being input to the communication session, that capture video data of a live audience to the live broadcast.

In various examples, the monitoring module 130 is configured to select aspects of the media data 134 that are to be shared with the participating client computing devices 106(1) through 106(N). Consequently, the monitoring module 130 may be configured to generate session data 136 based on the received media data 134 and/or pass the session data 136 to the output module 132. In various examples, the session data 136 can include main activity (e.g., dominant activity) of the communication session 104 performed by one or more primary contributors to the communication session. For instance, the main activity can include an attendee currently talking during a meeting, a scheduled speaker for a broadcast presentation, people actively collaborating and conversing about a topic of the communication session, etc.

The monitoring module 130 is also configured to receive and/or generate a designated list of attendees 138, who are to be monitored in order detect certain activity 140, or preset target events. The designated list of attendees 138 can be received by the monitoring module 130 when a user with certain permissions and privileges (e.g., a host of the communication session, a producer of the communication session, an attendee to the communication session, etc.) enters names of people attending the communication session 104 or expected to attend the communication session 104. Once names are received, the monitoring module 130 is configured to identify streams 134(1) through 134(N) (e.g., video stream, audio stream, etc.) that are associated with the entered names. As described above, a stream can comprise a video feed of video data captured by one of multiple different cameras fixed on attendees to the communication session. For example, a camera coupled to a personal device can capture sounds and movement of an attendee placed in front of the personal device. A camera configured in a conference room of an office can capture sounds and movement of attendees in the conference room. A camera configured in an assembly hall where a broadcast presentation is taking place can capture sounds and movements of attendees (e.g., live audience members) in the assembly hall.

The identification of a stream can be based on a match or a correspondence between an entered name (or other user identification) and login credentials used by an attendee to join the communication session 104 on a personal device (e.g., a user login ID and/or a password). For example, the monitoring module 130 can be given an entered name or other user identification that has been added to the designated list and can implement a scan of registered attendees that have joined the communication session in order to find a name or user identification that matches. Upon finding a match, a video feed associated with the matched name or user identification can be marked for monitoring so that preset target events of the designated person can be detected an accentuated in the graphical user interface of the communication session.

Alternatively, the identification of a stream can be based on a match or a correspondence between an entered name and facial features of a user (e.g., based on a stored image of a face of the user associated with the entered name). Using the facial features, a scan of people captured by a camera fixed on a particular area (e.g., an office conference room, a portion of an assembly hall, etc.) can be performed and facial recognition techniques can be used to determine a position of an individual attendee within the room or assembly hall and/or within a video feed of the room or assembly hall. Example facial recognition techniques use various algorithms to identify a user by using known facial features from a stored image of the user's face. For example, an algorithm can analyze the relative position, size, and/or shape of a facial feature such as the user's eyes, nose, cheekbones, lips, etc. The facial features are then used to search for images (e.g., video or video frames) with matching features. Facial recognition algorithms can be implemented in association with various approaches. A first approach comprises geometric recognition, which uses distinguishing features. A second approach comprises photometric recognition, which is a statistical approach that distills an image into values and compares the values with templates to eliminate variances. Voice recognition techniques can also or alternatively be used to determine a position of an individual attendee within the room.

In additional or alternative examples, an attendee to be added to the list of attendees 138 can be received via user input that manually selects a stream as one that contains an attendee on the list and/or via user input marking a position of the attendee within the stream, as further described herein.

In some examples, a session agenda or a session transcript can be used to add attendees to the list of attendees 138. For instance, an agenda and/or a transcript of topic(s) to be discussed and content to be shared may reveal names of attendees that are to be mentioned during the communication session 104 (e.g., "John Smith" is to receive a reward, a new product developed by "Jane Doe" is to be announced, a company is announcing that long time employee "Beth Williams" is retiring, etc.). Thus, names that are scheduled to be mentioned during the communication session 104 can provide a basis for adding an attendee to the list of attendees 138.

In various examples, the detected activity 140 comprises preset target event(s) for which the monitoring module 130 is specifically monitoring the identified streams. As described above, a preset target event can be based on body movement of an attendee, facial movement of an attendee, and/or an audible sound produced by an attendee. For example, a preset target event can include movements and/or sounds corresponding to a defined gesture. Thus, different types of target events can include a head nod, a head shake, clapping, switching from a sitting position to a standing position, raising a hand, etc. In another example, a preset target event can include movements and/or sounds corresponding to a facial expression. Thus, different types of preset target events can include a smile, a frown, a laugh, raised eyebrows, etc. In yet another example, a preset target event can include movements and/or sounds corresponding to an outward display of emotion. Thus, different types of preset target events can include a sad reaction, an angry reaction, a happy reaction, a surprised reaction, an excited reaction, a disappointed reaction, etc.

In various examples, the detection of a preset target event can be based on recognizing that an amount of body and/or facial movement of an attendee exceeds a threshold amount. In other examples, the detection of a preset target event can be based on recognizing that body and/or facial movement deviates from a previous position (e.g., a standard body pose, a normal facial expression, etc.). For example, motion analysis techniques can be used to detect image points, such as pixels, that move in a scene (e.g., a sequence of video frames). The motion analysis techniques can generate a binary image where image points that relate to moving points in the scene are set to one ("1") and all other points are set to zero ("0"). This binary image is then processed to remove noise, group neighboring pixels, and label objects. Based on the processing, image points associated with motion can reflect a threshold amount of user movement (e.g., a user raises a hand, a user claps, etc.) and/or can be matched with a type of preset target event (e.g., a smile, a frown, an expression of excitement, etc.).

Consequently, detected movement and/or detected sounds produced by audience members on the designated list of attendees 138 as a reaction to main activity of the communication session 104 can be recognized, and in some cases, the detected movement and/or detected sounds can be mapped to a specific type of preset target event.

In additional or alternative examples, a type of a preset target event can comprise: an attendee joining the communication session 104, an attendee leaving the communication session 104, recognition that an attendee on the list of attendees 138 begins to speak during the communication session 104, or any other activity determined to provide value or contribute to understanding a context of the communication session 104.

The monitoring module 130 monitors the identified streams that are associated with the individual attendees on the list 138 to detect an occurrence of a preset target event 142. The occurrences of preset target events 142 can then be passed to the output module 132 along with, or as part of, the session data 136. The output module 132 is configured to automatically (e.g., without user input) configure at least a portion of a graphical user interface associated with the communication session 104 to accentuate a stream that includes an occurrence of a preset target event 142 so that it is viewable by the attendees (e.g., audience) participating in the communication session 104. The automatic configuration is intended to bring focus to the occurrence of preset the target event 142, examples of which are further provided herein. For example, the video feed can replace another video feed already displayed in the graphical user interface of the communication session. In another example, the video feed can be displayed adjacent to a video feed that is already displayed in the graphical user interface. In yet another example, a size of a display area that contains the video feed can be increased in the graphical user interface of the communication session. In even a further example, a format of a display area that contains the video feed can be altered (e.g., highlighting, changing colors, flashing, etc.) in the graphical user interface. In some instances, a camera can perform a zoom function to zoom in on an individual attendee that is a source of the occurrence of the preset target event.

In order to display the graphical user interface, the output module 132 is configured to transmit (e.g., broadcast) communication data 144 to the client computing devices 106(1) through 106(N) as part of a live or recorded viewing of the communication session 104. As shown, the output module 132 transmits communication data 144(1) to client computing device 106(1), transmits communication data 144(2) to client computing device 106(2), transmits communication data 144(3) to client computing device 106(3), and transmits communication data 144(N) to client computing device 106(N), etc. The communication data transmitted to the client computing devices can be the same or can be different (e.g., the stream and/or the positioning of streams within a grid layout of a graphical user interface may vary from one device to the next).

The example of FIG. 1 illustrates that a computing device (e.g., client computing device 106(N)) can include or in some way be associated with one or more camera(s) 146 that are fixed on a live audience viewing a live broadcast. The live broadcast can include a presentation by a current speaker that is being broadcast, via the communication session 104, to other devices that are either (i) co-located at a place of the presentation (e.g., client computing device 106(N) can be coupled to a big display screen behind the speaker so content of the communication session 104 can be displayed to the audience) or (ii) remotely located in different places (e.g., client computing devices 106(1) through 106(3) may be located throughout the world).

As described above, attendees on the list of attendees 138 may be attendees in the audience being captured by camera(s) 146 and/or may be attendees located at the other client computing devices 106(1) through 106(3). Continuing this example, the speaker on the stage is a main or dominant contributor to the communication session 104, and thus, what she or he says and/or does on a physical stage or some other platform (e.g., as captured by a camera and produced via a stream) may be considered main activity displayed on a first portion 148 of a graphical user interface displayed on the display screen 128. The occurrence of preset target events 142 by attendees on the list of attendees (e.g., attendees in the audience, attendees viewing the presentation via a personal device or a conference room display screen, etc.) may be displayed separately on a second portion 150 of a graphical user interface displayed on the display screen 128. Examples of how the graphical user interface is configured to display the main activity and the preset target events are further provided herein with respect to FIGS. 5-8.

In various examples, priority rules help the monitoring module 130 select which preset target events to display (e.g., in a scenario when a large number of preset target events by designated attendees occur at the same time or within a short period of time, etc.).

In various embodiments, the monitoring module 130 can be configured to use rules 152 to prioritize occurrences of preset target events for display and to select an occurrence of a preset target event for display over other detected occurrences of preset target events. In one example, a rule 152 can prioritize a source of a preset target event (e.g., the person that performs the preset target event). This rule 152 can be applied so that more important occurrences of preset target events are displayed in a situation where multiple occurrences of preset target events take place at the same time, or within a short period of time (e.g., three seconds, five seconds, ten seconds, etc.). The rule 152 can be used to select an occurrence of a preset target event from one attendee on the list 138 (e.g., a CEO of the company) over another occurrence of another preset target event from another attendee on the list 138 (e.g., a lower-level employee of the company). Consequently, the attendees designated on the list 138 can be ranked based on importance to ensure that preset target events of the more important people on the list 138 are displayed in the communication session 104.

In some implementations, the selection can be based on content of the communication session 104 currently being shared. For instance, if a speaker is currently talking about a particular person or talking about subject matter related to a particular person, then a preset target event performed by that person, who is on the list 138, is selected over other preset target events performed by other attendees on the list.

In another example, a rule 152 can prioritize a type of preset target event. Again, the rule can be applied so that more important occurrences of preset target events are displayed in a situation where multiple occurrences of preset target events take place at the same time, or within a short period of time. The rule 152 can be used to select occurrences of a specific type of preset target event (e.g., an occurrence of people clapping and/or smiling) over occurrences of other types of preset target events (e.g., people booing or frowning). Consequently, types of preset target events can be ranked based on importance to ensure that more important types of preset target events are displayed in the communication session 104. Moreover, the selection can be based on content of the communication session 104 currently being shared. For instance, if a question and answer portion of a communication session 104 is currently taking place, then a "hand raising" type preset target event performed by an attendee on the list 138 can be selected over a "clapping" type preset target event performed by another attendee on the list 138.

Figure 2:
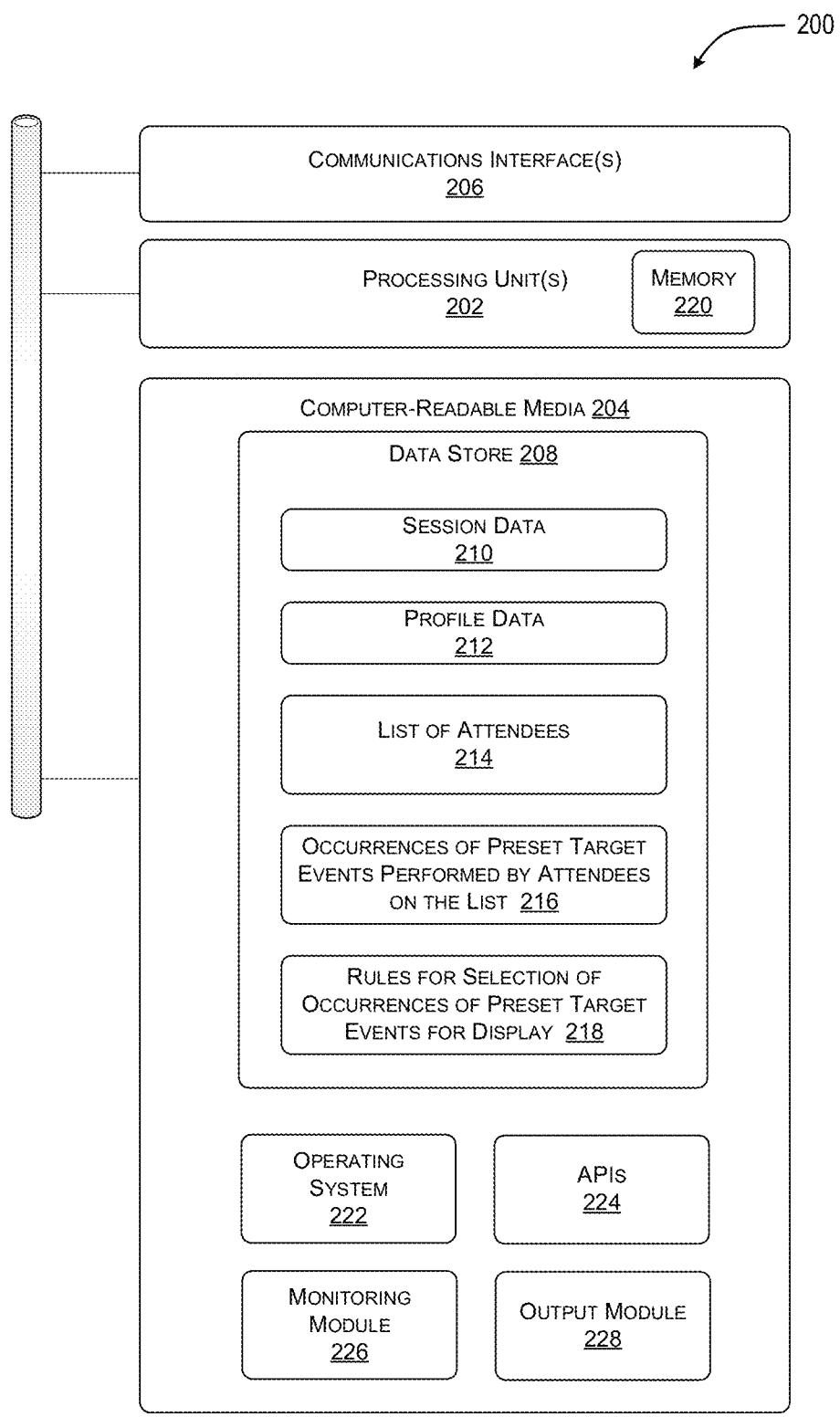
FIG. 2 is a diagram illustrating example components of an example device configured to detect and to display occurrences of preset target events associated with a designated list of attendees.

FIG. 2 illustrates a diagram that shows example components of an example device 200 configured to detect and to display occurrences of preset target events associated with a designated list of attendees. The device 200 may represent one of device(s) 110. Additionally or alternatively, the device 200 may represent one of the client computing devices 106. As illustrated, the device 200 includes one or more processing unit(s) 202, computer-readable media 204, and communication interface(s) 206. The components of the device 200 are operatively connected, for example, via a bus, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes a data store 208. In some examples, data store 208 includes data storage such as a database, data warehouse, or other type of structured or unstructured data storage. In some examples, data store 208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XIVIL") tables, for example.

The data store 208 may store data for the operations of processes, applications, components, and/or modules stored in computer-readable media 204 and/or executed by processing unit(s) 202. For instance, in some examples, data store 208 may store session data 210 (e.g., session data 136), profile data 212 (e.g., associated with a participant or attendee profile), and/or other data. The session data 210 can include a total number of attendees (e.g., users and/or client computing devices) to a communication session, activity that occurs in the communication session, a list of invitees to the communication session, and/or other data related to when and how the communication session is conducted or hosted.

The data store 208 can also include a list of attendees 214 (e.g., the list of attendees 138 from FIG. 1) which identifies users to be monitored in order to detect certain activity, or occurrences of preset target events 216 which can also be stored in the data store 208. Further, the data store 208 can maintain rules 218 (e.g., rules 152) that prioritize occurrences of preset target events and that can be used to select one or more first occurrences of preset target events over one or more second occurrences of preset target events (e.g., that happen at the same time or within a short period of time).

Alternatively, some or all of the above-referenced data can be stored on separate memories 220 on board one or more processing unit(s) 202 such as a memory on board a CPU-type processor, a GPU-type processor, an FPGA-type accelerator, a DSP-type accelerator, and/or another accelerator. In the example of FIG. 2, the computer-readable media 204 can also include operating system 222 and application programming interface(s) 224 configured to expose the functionality and the data of the device 200 to other devices. Additionally, the computer-readable media 204 can include one or more modules such as a monitoring module 226 (e.g., monitoring module 130) and an output module 228 (e.g., output module 132), although the number of illustrated modules is just an example, and the number may vary higher or lower. That is, functionality described herein in association with the illustrated modules may be performed by a fewer number of modules or a larger number of modules on one device or spread across multiple devices.

Figure 3:
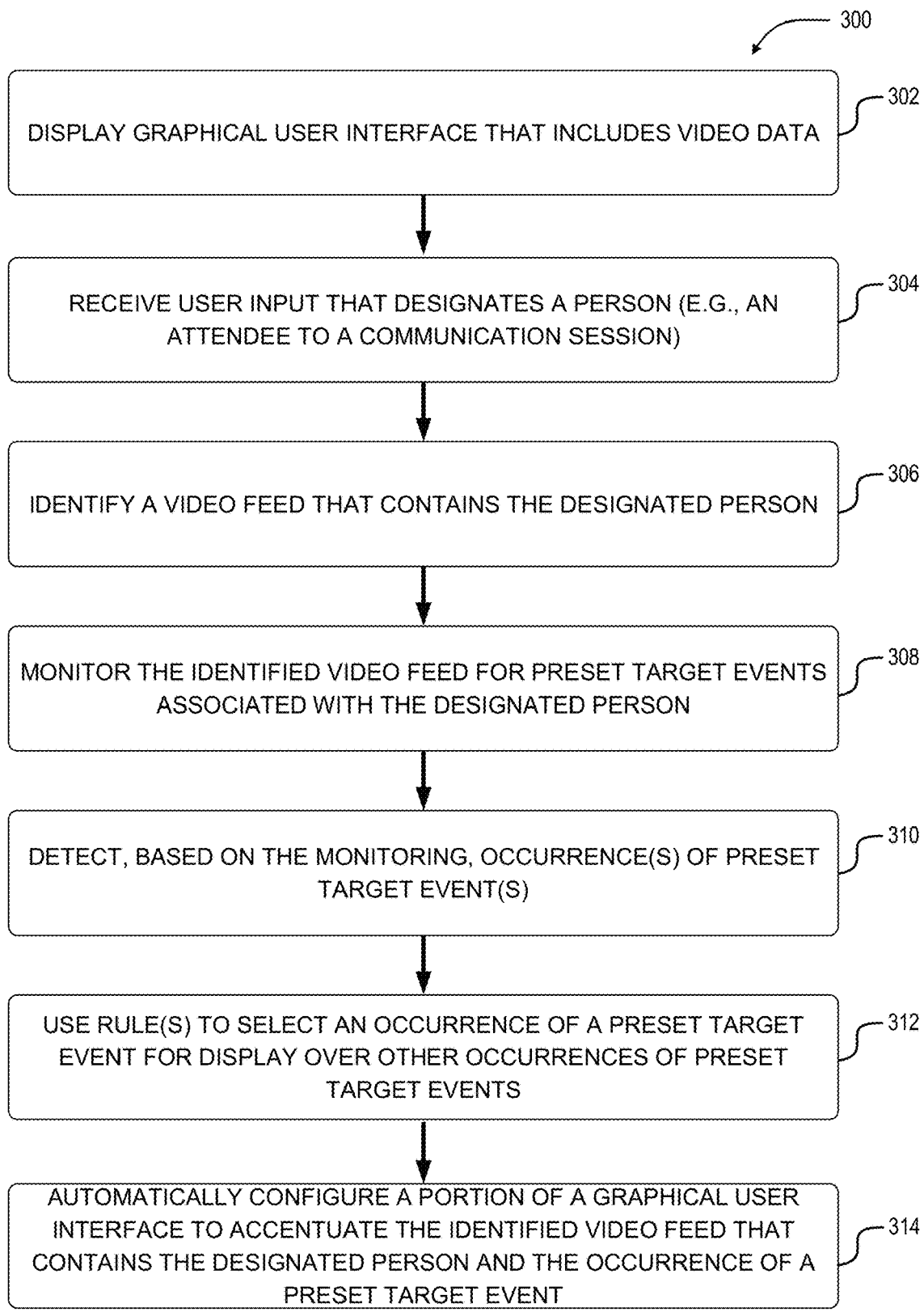
FIG. 3 is a diagram of an example flowchart that illustrates operations directed to detecting and to accentuating occurrences of preset target events associated with a designated list of attendees.

FIG. 3 illustrates an example flowchart. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., device 110, one of client computing devices 106(1) through 106(N), and/or device 200) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 3 can be implemented in association with the example graphical user interfaces described herein with respect to FIGS. 4-8. For instance, the various device(s) and/or module(s) in FIGS. 1 and/or 2 can generate, receive, transmit, and/or display data associated with content of a communication session (e.g., live content, recorded content, etc.).

FIG. 3 is a diagram of an example flowchart 300 that illustrates operations directed to detecting and to displaying occurrences of preset target events associated with a designated list of attendees.

At operation 302, a graphical user interface that includes video data is caused to be displayed. As described above, the video data can be associated with one or more initial video feeds that capture a presenter of a live broadcast. Alternatively, the video data can be associated with one or more initial video feeds of participants to a video conference.

At operation 304, user input that designates a person is received. The user input can be provided in association with creation of a designated list of attendees to the communication session. The number of attendees on the list is less than a total number of attendees to the communication session. An attendee can be added to the list in a variety of different ways before the communication session begins or while the communication is taking place, as described above and as further illustrated herein with respect to FIG. 4.

At operation 306, a video feed that contains the designated person is identified. As described above, the video feed may capture an attendee on the list sitting in a crowd viewing the shared content live at a broadcast location where a presentation is taking place. Or the video feed may capture an attendee sitting around a large table in an office conference room viewing the shared content of a communication session with other colleagues via a display screen. Even further, the video feed may capture an attendee sitting or standing in front of a personal device (e.g., tablet, smartphone, computer, etc.) viewing the shared content of a communication session alone in an office or at home.

At operation 308, the identified video feed is monitored for preset target events associated with the designated person. Example types of preset target events are described above.

At operation 310, an occurrence of a preset target event being monitored for is detected.

At operation 312, rules to prioritize and to select an occurrence of a preset target event for display over other occurrence(s) of preset target event(s) can optionally be applied and used. For example, the selection of the occurrence of the preset target event can be prioritized based on a particular person being a source of a preset target event and/or a type of a preset target event. The rules can be applied to a particular segment (e.g., time period) of the communication sessions, such that the priority assigned to attendees on the list and/or to types of preset target events based on a rule may change from one segment to the next.

At operation 314, a portion of a graphical user interface is automatically configured to accentuate the identified video feed that includes the designated person and a selected occurrence of the preset target event. For example, the video feed can replace another video feed already displayed in the graphical user interface of the communication session. In another example, the video feed can be displayed adjacent to a video feed that is already displayed in the graphical user interface. In yet another example, a size of a display area that contains the video feed can be increased in the graphical user interface of the communication session. In even a further example, a format of a display area that contains the video feed can be altered (e.g., highlighting, changing colors, flashing, etc.) in the graphical user interface. Examples of how the portion of the graphical user interface is automatically configured to accentuate the identified video feed are illustrated and described herein with respect to FIGS. 5-8.

Figure 4:
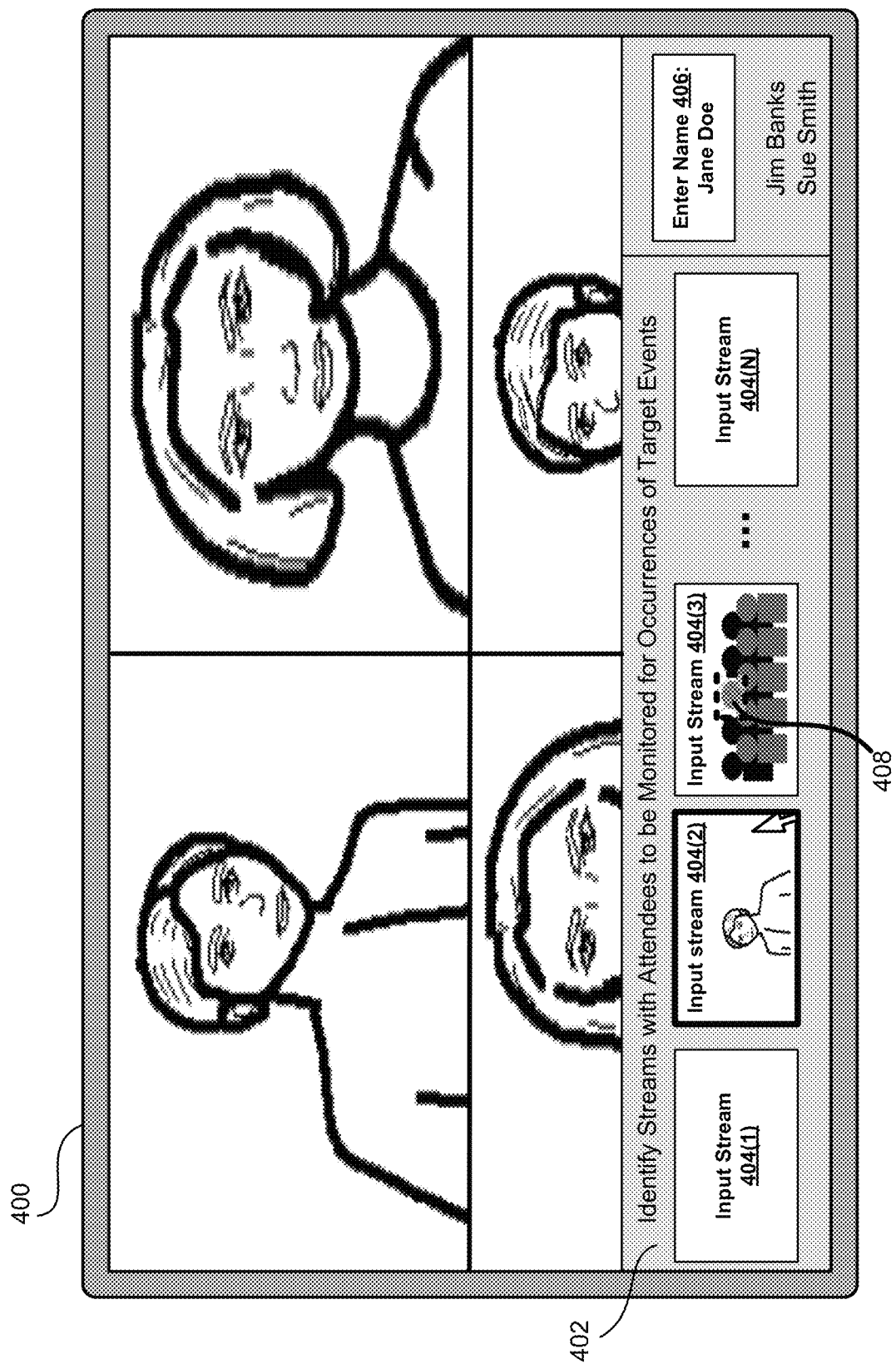
FIG. 4 illustrates an example graphical user interface (GUI) configured to display user interface control elements that enable a user with permissions and privileges (e.g., a producer, a host, etc.) to add an attendee to a designated list of attendees.

FIG. 4 illustrates an example graphical user interface (GUI) 400 configured to display user interface control elements that enable a user with permissions and privileges (e.g., a producer, a host, etc.) to add an attendee to a designated list of attendees. As illustrated, the bottom of the GUI 400 includes a region 402 where separate input streams 404(1) through 404(N) (e.g., streams 134(1) through 134(N)) are displayed. In this example, the region 402 overlays a view or a layout that captures content being shared during a communication session. The view or the layout may initially be occupied by the most relevant and dominant speakers and/or content items that contribute to the discussion of a topic of a communication session at any particular time.

In one example, a user can scroll through all the input streams to a communication session in a horizontal and/or vertical manner and directly select a stream in order to have an attendee added to the list. As shown, the user can click on the input stream 404(2) so that the attendee shown in that input stream can be added to the list.

In another example, the user can enters named into a field 406 to have the name added to the list (e.g., "Jane Doe" is added to a list that includes "Jim Banks" and "Sue Smith"). The names can be entered prior to commencement of the communication session or during the communication session. Once names are received, the monitoring module 130 is configured to identify streams from streams 404(1) through 404(N) that are associated with the entered names. The identification of a stream can be based on a match or a correspondence between an entered name (or other user identification) and login credentials used by an attendee to join the communication session on a personal device (e.g., a user login ID and/or a password). Alternatively, the identification of a stream can be based on a match or a correspondence between an entered name and facial features of a user (e.g., based on a stored image). Using the facial features, a scan of people captured by a camera fixed on a particular area (e.g., an office conference room, a portion of an assembly hall, etc.) can be performed and facial recognition techniques can be used to determine a position of an individual attendee within the room and/or within a streamed input of the room. For example, a stored image of Jane Doe that highlights her facial recognition features can be used to determine where Jane Doe is sitting in particular position of an audience, as shown by the window 408 within input stream 404(3) (e.g., the window 408 can be presented with a notification requiring a user to confirm that the attendee identified is the intended person to be located). Furthermore, an attendee to be added to the list can be received via user input that manually marks a position of the attendee within a stream (e.g., alternatively the user can provide input that defines the window 408 within the input stream 404(3)).

People can also be added to the list of attendees by association. That is, if a first name or user identification is added to the list of attendees, a second name or user identification of someone associated with the first name or user identification can automatically be added to the list of attendees. The association can be established based on a history and/or based on a type of relationship. For example, the history can indicate that the associated people typically attend and/or contribute to communication sessions with one another (e.g., a husband and a wife, a chief executive officer and a vice president of operations, etc.).

In some implementations, a designated list of attendees to be monitored can be a personal list created by an individual attendee. To illustrate, a first attendee to a communication session may have an interest in subscribing to and viewing target events from a first subset of attendees, while a second attendee to the same communication session may have an interest in subscribing to and viewing target events from a second subset of attendees that is different than the first subset. To this end, the techniques describe herein can be used to enable a customized view of activity that is reactive to main or dominant activity.

Figure 5:
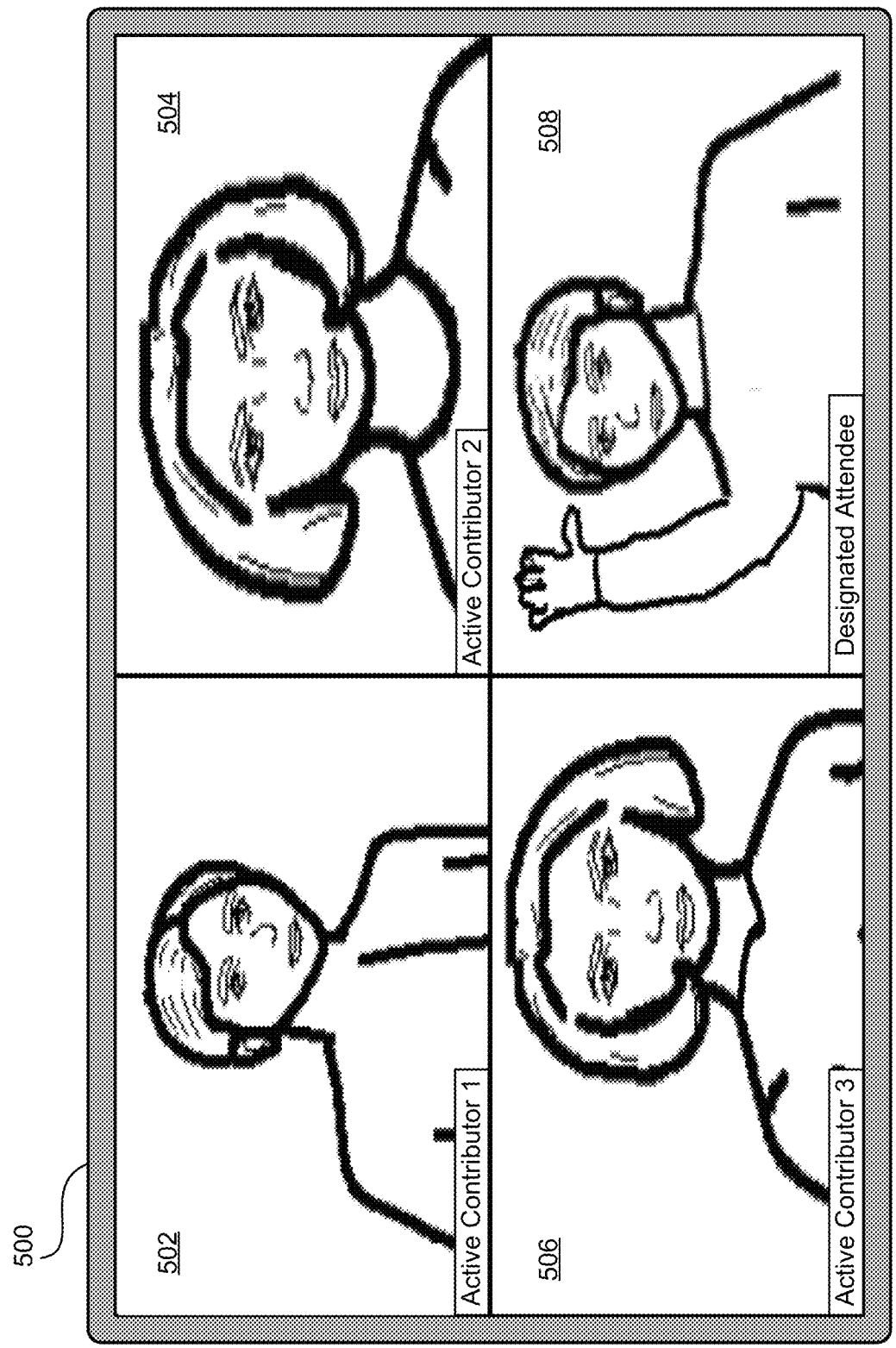
FIG. 5 illustrates an example graphical user interface (GUI) configured to display a video feed that includes an occurrence of a preset target event in order to bring viewing focus to the occurrence of the preset target event.

FIG. 5 illustrates an example graphical user interface (GUI) 500 configured to display a stream that includes an occurrence of a preset target event in order to bring viewing focus to the occurrence of the target event. When multiple attendees are displayed within a view or a layout of a communication session, the system 102 may identify which portion of a graphical user interface each attendee is to be displayed within. In the illustrated scenario, the view or the layout includes four distinct display areas, although the number of display areas may vary based on different views and layouts. The upper left display area 502 includes a first active contributor, the upper right display area 504 includes a second active contributor, and the lower left display area 506 includes a third active contributor. These three display areas that include the three people actively contributing to the communication session may comprise the first portion 148 of the graphical user interface that captures the main activity (e.g., dominant activity), as illustrated and described above with respect to FIG. 1.

In contrast, the lower right display area 508 includes a designated attendee who recently and/or currently is moving and/or producing sound that corresponds to a preset target event (e.g., raising a hand). Accordingly, the lower right display area 508, in this example, may comprise the second portion 150 of the graphical user interface that captures an occurrence of a preset target event performed by a designated attendee on the list, as illustrated and described above with respect to FIG. 1. As shown, the graphical user interface 500 is automatically configured or reconfigured so that attendees to the communication session can view the occurrence of the preset target event in the lower right display area 508. The automatic configuration is intended to bring focus to the occurrence of the preset target event. Thus, the stream in the lower right display area 508 can replace another stream (e.g., of an active contributor, of another designated attendee, etc.) previously displayed in the layout of the communication session. In various examples, the display area replaced is arbitrary. However, in other examples, the display area in which the replacing occurs can be selected in order to visually associate, or make a connection between, an action by a first user and a reaction to the action by an attendee.

In some implementations, the graphical user interface may only include one stream of an active contributor (e.g., a live broadcast presenter) and the stream that contains the occurrence of the preset target event is added to next to the one stream already displayed in the graphical user interface, or the stream that contains the occurrence of the preset target event replaces the one stream already displayed in the graphical user interface.

Figure 6:
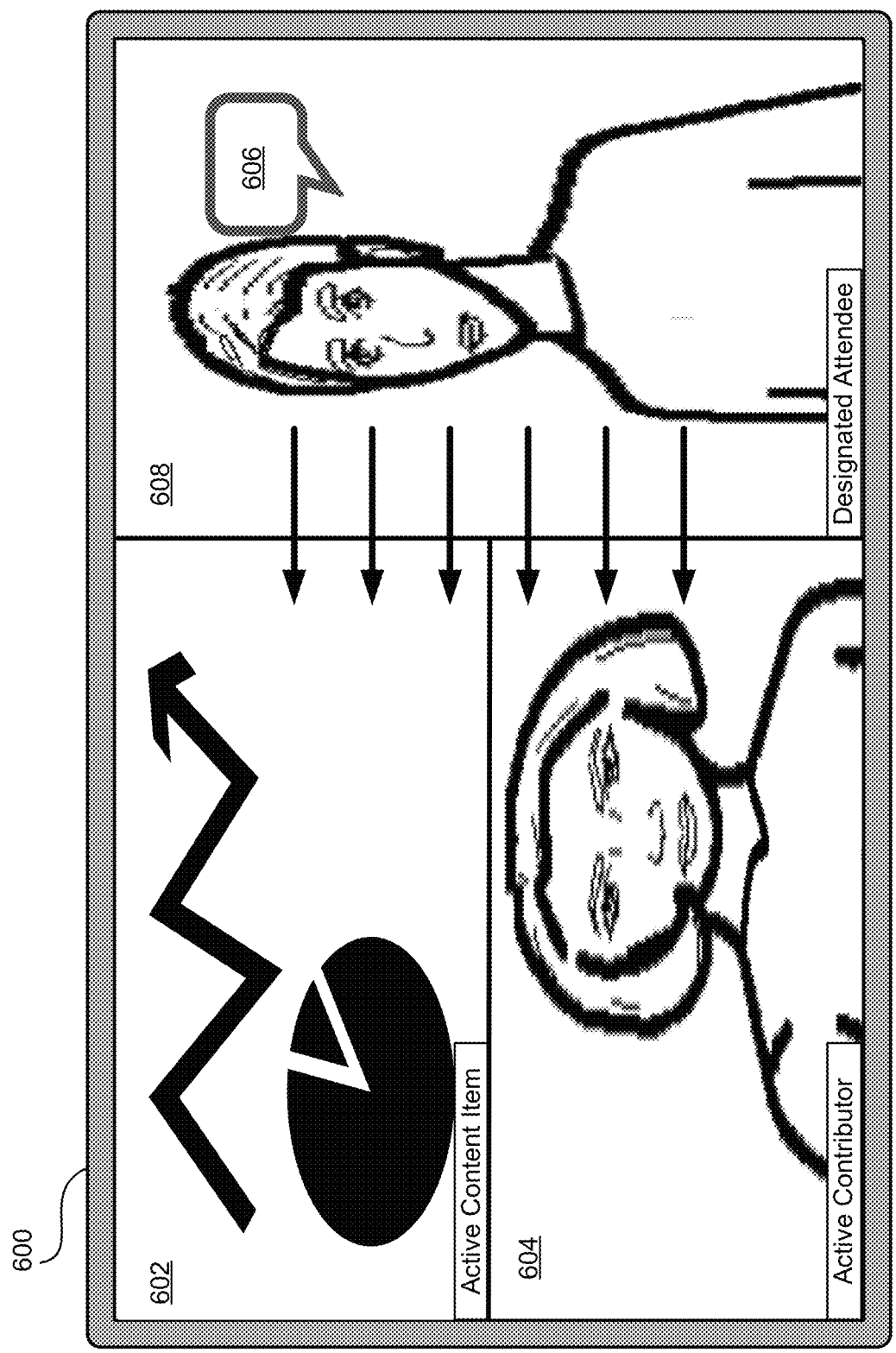
FIG. 6 illustrates another example graphical user interface (GUI) configured to display a video feed that includes an occurrence of a preset target event in order to bring viewing focus to the occurrence of the preset target event.

Turning to FIG. 6, another example graphical user interface (GUI) 600 configured to display a stream that includes an occurrence of a target event is illustrated. In the illustrated scenario, a transition from a view or a layout that includes two distinct display areas to a view or a layout that includes three distinct display areas is occurring.

The view of the layout that includes the two distinct display areas includes an upper display area 602 and a lower display area 604. The upper display area 602 includes an active content item currently being presented or discussed, and the lower display area 604 includes an active contributor. These two display areas may comprise the entire graphical user interface 600 prior to the detection and display of an occurrence of a preset target event. However, upon the detection of an occurrence of a preset target event by a designated attendee on the list (e.g., the designated attendee begins speaking 606), a new display area 608 slides or transitions into the view or the layout. After the transition, display area 602 and display area 604 may comprise the first portion 148 of the graphical user interface that captures the main activity, as illustrated and described above with respect to FIG. 1, while display area 608 may comprise the second portion 150 of the graphical user interface that captures an occurrence of a preset target event performed by a designated attendee on the list, as illustrated and described above with respect to FIG. 1.

Figure 7:
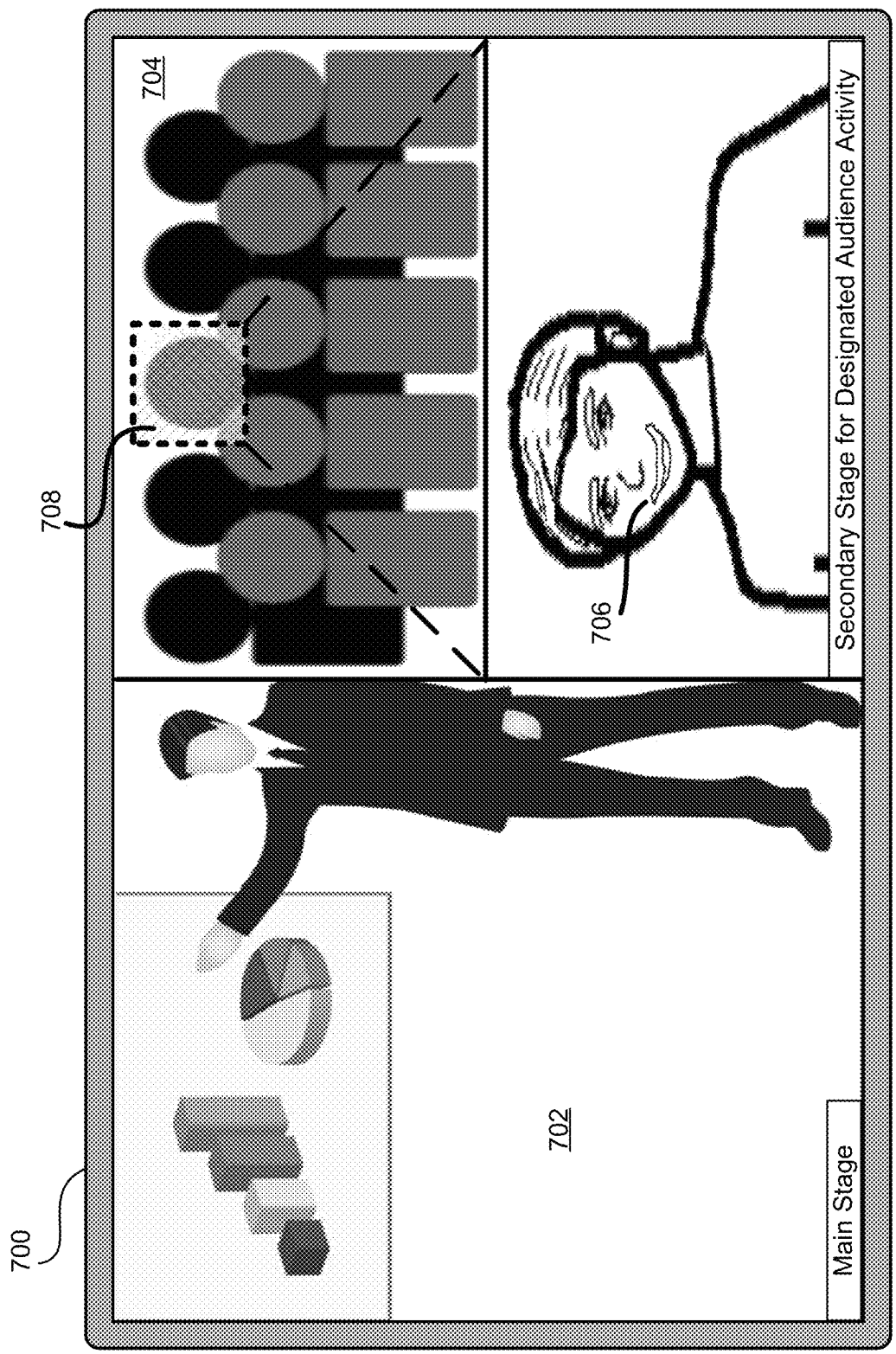
FIG. 7 illustrates yet another example graphical user interface (GUI) configured to display a video feed that includes an occurrence of a preset target event in order to bring viewing focus to the occurrence of the preset target event.

FIG. 7 illustrates yet another example graphical user interface (GUI) 700 configured to display a stream that includes an occurrence of a preset target event in order to bring viewing focus to the occurrence of the preset target event. FIG. 7 illustrates a view or a layout with a first portion 702 that captures main activity of a main stage (e.g., a presenter going over charts) and a second portion 704 that captures occurrences of preset target events. In this illustrated scenario, the second portion 704 of the graphical user interface may be dedicated to displaying audience reactions to what happens on the main or dominant stage (e.g., what the presenter says or does). Accordingly, the second portion 704 may be referred to as a secondary stage or a reactionary stage.

Upon the detection of an occurrence of a preset target event by a designated attendee on the list (e.g., the designated attendee smiles 706), a camera can be configured to zoom in on the designated attendee to capture a better view of the occurrence of the preset target event. In this example, the second portion 704 displays the audience within which a position 708 of the designated attendee has been previously marked or identified, as well as a zoomed-in image that captures a closer view of the occurrence of the target event (e.g., a smile 706). Furthermore, the camera can be configured to zoom out in order to capture a group reaction (e.g., laughing and smiling) by the people surrounding the designated attendee.

To further accentuate the occurrence of the preset target event, a display area in which the stream that captures the occurrence of the preset target event is displayed can increase in size, the stream that captures the occurrence of the preset target event can be re-positioned from one display area to another display area, or a display area in which the stream that captures the occurrence of the preset target event is displayed can change formats (e.g., be highlighted, change colors, have flashing applied, etc.).

In various embodiments, multiple different "virtual" streams can be created from a single input video stream. For example, a camera can be configured to identify space, in its video stream, around multiple designated attendees in an audience. Consequently, first space in the video stream corresponding to a first designated attendee can make up a first virtual stream for monitoring and detection purposes, and second space in the same video stream corresponding to a second designated attendee can make up a second virtual stream for monitoring and detection purposes.

Figure 8:
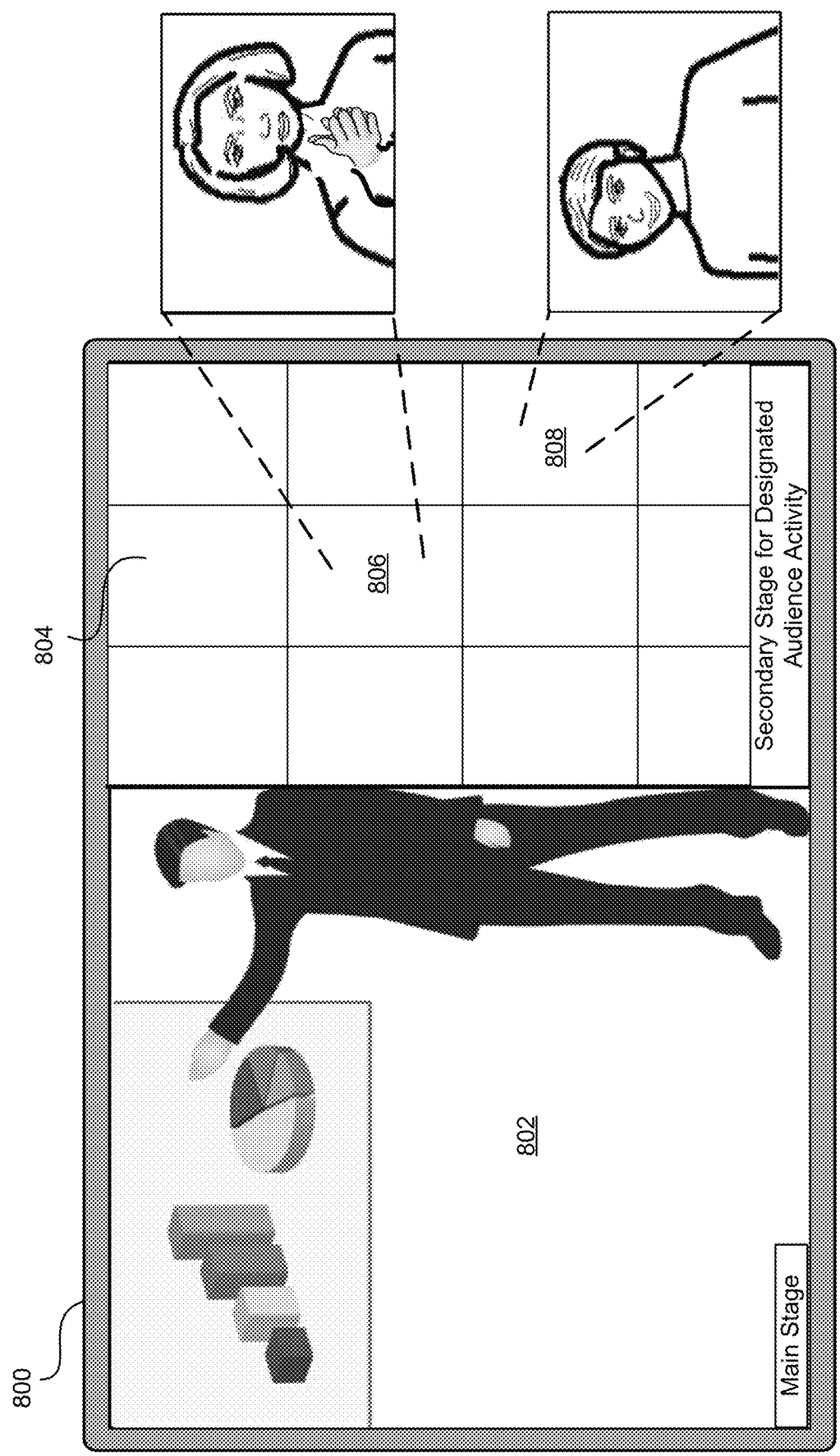
FIG. 8 illustrates yet a further example graphical user interface (GUI) configured to display a video feed that includes an occurrence of a preset target event in order to bring viewing focus to the occurrence of the preset target event.

FIG. 8 illustrates yet a further example graphical user interface (GUI) 800 configured to display a stream that includes an occurrence of a preset target event in order to bring viewing focus to the occurrence of the preset target event. Similar to FIG. 7, FIG. 8 illustrates a view or a layout with a first portion 802 that captures main activity of a main or dominant stage (e.g., a presenter going over charts) and a second portion 804 that captures occurrences of preset target events. In this illustrated scenario, the second portion 804 of the graphical user interface may be configured to capture an aggregation of reactions of the designated list of attendees to what happens on the main or dominant stage (e.g., what the presenter says or does) at a particular point in time or during a period of time.

Consequently, the second portion 804 can be divided into a number of display areas corresponding to a number of detected occurrences of target events for the designated list of attendees. As shown, a first display area 806 may capture a first designated attendee clapping while a second display area 808 may capture a second designated attendee smiling.

The disclosure presented herein may be considered in view of the following clauses.

Example Clause A, a system comprising: one or more processing units; and a computer-readable medium having encoded thereon computer-executable instructions to cause the one or more processing units to: cause a graphical user interface to be displayed, the graphical user interface populated with video data; receive user input that designates a person; identify a video feed that contains the designated person, the video feed being one of a plurality of video feeds; monitor the video feed for preset target events associated with the designated person; detect, based on the monitoring of the video feed, an occurrence of a preset target event associated with the designated person; and responsive to detecting the occurrence of the preset target event, automatically configure at least a portion of the graphical user interface to accentuate the video feed.

Example Clause B, the system of Example Clause A, wherein the video data is displayed in association with a communication session that comprises a live broadcast presentation and the designated person is attending the live broadcast presentation.

Example Clause C, the system of Example Clause A, wherein the video data is displayed in association with a communication session that comprises a video conference and the designated person is a participant in the video conference.

Example Clause D, the system of any one of Example Clauses A through C, wherein the designated person is included on a list of designated persons to be monitored, the list of designated persons comprising a subset of a total number of persons attending a communication session.

Example Clause E, the system of Example Clause D, wherein identifying the video feed that contains the designated person comprises matching identification information included on the list of designated persons with login credentials used by the designated person to attend the communication session via a personal device.

Example Clause F, the system of any one of Example Clauses A through D, wherein identifying the video feed that contains the designated person comprises using facial recognition techniques to determine that the designated person is contained within the video feed.

Example Clause G, the system of any one of Example Clauses A through D, wherein identifying the video feed that contains the designated person is based on at least one of: additional user input that selects the video feed; or additional user input that marks a location of the designated person within the video feed.

Example Clause H, the system of any one of Example Clauses A through G, wherein an individual preset target event represents a reaction and comprises at least one of: a gesture, a facial expression, or an outward display of emotion.

Example Clause I, the system of any one of Example Clauses A through H, wherein detecting the occurrence of the preset target event associated with the designated person comprises determining that at least one of body movement occurs, facial movement occurs, or an audible sound is produced.

Example Clause J, the system of any one of Example Clauses A through I, wherein the automatic configuration of at least the portion of the graphical user interface to accentuate the video feed comprises at least one of: displaying the video feed adjacent to the video data; replacing the video data with the video feed for a temporary period of time; increasing a size of a display area that includes the video feed; or altering a format of a display area that includes the video feed.

Example Clause K, the system of any one of Example Clauses A through J, wherein the computer-executable instructions further cause the one or more processing units to select the occurrence of the preset target event for display over other occurrences of preset target events based on a rule that prioritizes at least one of a type of preset target event or the designated person as a source of a preset target event.

Example Clause L, a method comprising: causing a graphical user interface to be displayed, the graphical user interface populated with video data; receiving user input that designates a person; identifying a video feed that contains the designated person, the video feed being one of a plurality of video feeds; monitoring the video feed for preset target events associated with the designated person; detecting, based on the monitoring of the video feed, an occurrence of a preset target event associated with the designated person; and responsive to detecting the occurrence of the preset target event, automatically configuring at least a portion of the graphical user interface to accentuate the video feed.

Example Clause M, the method of Example Clause L, wherein identifying the video feed that contains the designated person comprises at least one of: matching identification information included on a list of designated persons with login credentials used by the designated person to attend a communication session via a personal device; or using facial recognition techniques to determine that the designated person is contained within the video feed.

Example Clause N, the method of Example Clause L, wherein identifying the video feed that contains the designated person is based on at least one of: additional user input that selects the video feed; or additional user input that marks a location of the designated person within the video feed.

Example Clause O, the method of any one of Example Clauses L through N, wherein detecting the occurrence of the preset target event associated with the designated person comprises determining that at least one of body movement occurs, facial movement occurs, or an audible sound is produced.

Example Clause P, the method of any one of Example Clauses L through O, wherein the automatic configuration of at least the portion of the graphical user interface to accentuate the video feed comprises at least one of: displaying the video feed adjacent to the video data; replacing the video data with the video feed for a temporary period of time; increasing a size of a display area that includes the video feed; or altering a format of a display area that includes the video feed.

Example Clause Q, a system comprising: means for causing a graphical user interface to be displayed, the graphical user interface populated with video data; means for receiving user input that designates a person; means for identifying a video feed that contains the designated person, the video feed being one of a plurality of video feeds; means for monitoring the video feed for preset target events associated with the designated person; means for detecting, based on the monitoring of the video feed, an occurrence of a preset target event associated with the designated person; and means for automatically configuring at least a portion of the graphical user interface to accentuate the video feed.

Example Clause R, the system of Example Clause Q, wherein identifying the video feed that contains the designated person comprises at least one of: matching identification information included on a list of designated persons with login credentials used by the designated person to attend a communication session via a personal device; or using facial recognition techniques to determine that the designated person is contained within the video feed.

Example Clause S, the system of Example Clause Q or Example Clause R, wherein the automatic configuration of at least the portion of the graphical user interface to accentuate the video feed comprises at least one of: displaying the video feed adjacent to the video data; replacing the video data with the video feed for a temporary period of time; increasing a size of a display area that includes the video feed; or altering a format of a display area that includes the video feed.

Example Clause T, the system of any one of Examples Clause Q through S, wherein the designated person is included on a list of designated persons to be monitored, the list of designated persons comprising a subset of a total number of persons attending a communication session.

Although the techniques have been described in language specific to structural features and/or methodological acts, it is to be understood that the appended claims are not necessarily limited to the features or acts described. Rather, the features and acts are described as example implementations of such techniques.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processing units; and
   a computer-readable medium having encoded thereon computer-executable instructions to cause the one or more processing units to:
   cause a graphical user interface to be displayed, the graphical user interface populated with video data;
   receive user input that designates a person;
   identify a video feed that contains the designated person, the video feed being one of a plurality of video feeds;
   monitor the video feed for preset target events associated with the designated person;
   detect, based on the monitoring of the video feed, an occurrence of a preset target event associated with the designated person; and
   responsive to detecting the occurrence of the preset target event, automatically configure at least a portion of the graphical user interface to accentuate the occurrence of the preset target event associated with the designated person, wherein the automatic configuration of the portion of the graphical user interface includes:
   adding a display area that includes the video feed containing the designated person to the portion of the graphical user interface; or
   increasing a size of the designated person contained in the video feed which is displayed in the portion of the graphical user interface.

2. The system of claim 1, wherein the video data is displayed in association with a communication session that comprises a live broadcast presentation and the designated person is attending the live broadcast presentation.

3. The system of claim 1, wherein the video data is displayed in association with a communication session that comprises a video conference and the designated person is a participant in the video conference.

4. The system of claim 1, wherein the designated person is included on a list of designated persons to be monitored, the list of designated persons comprising a subset of a total number of persons attending a communication session, the list of designated persons established before the communication session starts.

5. The system of claim 4, wherein identifying the video feed that contains the designated person comprises matching identification information included on the list of designated persons with login credentials used by the designated person to attend the communication session via a personal device.

6. The system of claim 1, wherein identifying the video feed that contains the designated person comprises using facial recognition techniques to determine that the designated person is contained within the video feed.

7. The system of claim 1, wherein identifying the video feed that contains the designated person is based on at least one of:
   additional user input that selects the video feed; or
   additional user input that marks a location of the designated person within the video feed.

8. The system of claim 1, wherein an individual preset target event represents a reaction and comprises at least one of: a gesture, a facial expression, or an outward display of emotion.

9. The system of claim 1, wherein detecting the occurrence of the preset target event associated with the designated person comprises determining that at least one of body movement occurs, facial movement occurs, or an audible sound is produced.

10. The system of claim 1, wherein the automatic configuration of at least the portion of the graphical user interface further includes replacing the video data with the video feed for a temporary period of time.

11. The system of claim 1, wherein the computer-executable instructions further cause the one or more processing units to select the occurrence of the preset target event for display over other occurrences of preset target events based on a rule that prioritizes at least one of a type of preset target event or the designated person as a source of a preset target event.

12. The system of claim 1, wherein increasing the size of the designated person comprises increasing a size of a display area that includes the video feed within the portion of the graphical user interface.

13. The system of claim 1, wherein increasing the size of the designated person comprises implementing a zoom function on the video feed.

14. A method comprising:
   causing a graphical user interface to be displayed, the graphical user interface populated with video data;
   receiving user input that designates a person;
   identifying a video feed that contains the designated person, the video feed being one of a plurality of video feeds;
   monitoring the video feed for preset target events associated with the designated person;
   detecting, based on the monitoring of the video feed, an occurrence of a preset target event associated with the designated person; and
   responsive to detecting the occurrence of the preset target event, automatically configuring at least a portion of the graphical user interface to accentuate the occurrence of the preset target event associated with the designated person, wherein the automatic configuration of the portion of the graphical user interface includes:
      adding a display area that includes the video feed containing the designated person to the portion of the graphical user interface; or
      increasing a size of the designated person contained in the video feed which is displayed in the portion of the graphical user interface.

15. The method of claim 14, wherein identifying the video feed that contains the designated person comprises at least one of:
   matching identification information included on a list of designated persons with login credentials used by the designated person to attend a communication session via a personal device, wherein the list of designated persons is established before the communication session starts; or
   using facial recognition techniques to determine that the designated person is contained within the video feed.

16. The method of claim 14, wherein identifying the video feed that contains the designated person is based on at least one of:
   additional user input that selects the video feed; or
   additional user input that marks a location of the designated person within the video feed.

17. A system comprising:
   means for causing a graphical user interface to be displayed, the graphical user interface populated with video data;
   means for receiving user input that designates a person;
   means for identifying a video feed that contains the designated person, the video feed being one of a plurality of video feeds;
   means for monitoring the video feed for preset target events associated with the designated person;
   means for detecting, based on the monitoring of the video feed, an occurrence of a preset target event associated with the designated person; and
   means for automatically configuring at least a portion of the graphical user interface to accentuate the occurrence of the preset target event associated with the designated person, wherein the automatic configuration of the portion of the graphical user interface includes:
      adding a display area that includes the video feed containing the designated person to the portion of the graphical user interface; or
      increasing a size of the designated person contained in the video feed which is displayed in the portion of the graphical user interface.

18. The system of claim 17, wherein identifying the video feed that contains the designated person comprises at least one of:
   matching identification information included on a list of designated persons with login credentials used by the designated person to attend a communication session via a personal device; or
   using facial recognition techniques to determine that the designated person is contained within the video feed.

19. The system of claim 17, wherein the automatic configuration of at least the portion of the graphical user interface further includes replacing the video data with the video feed for a temporary period of time.

20. The system of claim 17, wherein the designated person is included on a list of designated persons to be monitored, the list of designated persons comprising a subset of a total number of persons attending a communication session, the list of designated persons established before the communication session starts based on names included in an agenda for the communication session.

* * * * *